United States Patent
Kusakabe et al.

(10) Patent No.: US 6,933,070 B2
(45) Date of Patent: Aug. 23, 2005

(54) POLYMER ELECTROLYTE FUEL CELL AND CONDUCTIVE SEPARATOR PLATE THEREOF

(75) Inventors: Hiroki Kusakabe, Sakai (JP); Kazuhito Hatoh, Osaka (JP); Hideo Ohara, Katano (JP); Nobuhiro Hase, Mino (JP); Susumu Kobayashi, Ikoma (JP); Tatsuto Yamazaki, deceased, late of Moriguchi (JP); by Masayo Sugou, legal representative, Tokyo (JP); Shinsuke Takeguchi, Kadoma (JP)

(73) Assignee: Matushita Electric Industrial Co., Ltd., Osaka (JP)

(*) Notice: Subject to any disclaimer, the term of this patent is extended or adjusted under 35 U.S.C. 154(b) by 49 days.

(21) Appl. No.: 10/238,904

(22) Filed: Sep. 11, 2002

(65) Prior Publication Data

US 2003/0072986 A1 Apr. 17, 2003

(30) Foreign Application Priority Data

Sep. 11, 2001 (JP) ........................................ 2001-274602

(51) Int. Cl.[7] .......................... H01M 2/00; C04B 35/00
(52) U.S. Cl. ............................. 429/34; 429/35; 429/32; 429/38; 264/105
(58) Field of Search .............................. 429/34, 38, 39, 429/30, 32, 35, 26; 252/510, 511; 264/105; 428/358, 327; 204/627, 297.1

(56) References Cited

U.S. PATENT DOCUMENTS

| | | | | |
|---|---|---|---|---|
| 6,080,503 A | * | 6/2000 | Schmid et al. | 429/35 |
| 6,440,597 B1 | * | 8/2002 | Mizuno | 429/34 |
| 2002/0012827 A1 | * | 1/2002 | Mizuno et al. | 429/34 |
| 2002/0028368 A1 | * | 3/2002 | Saito et al. | 429/34 |

FOREIGN PATENT DOCUMENTS

| | | |
|---|---|---|
| JP | 62-256380 | 11/1987 |
| JP | 08-037012 | 2/1996 |
| JP | 08-045517 | 2/1996 |
| JP | 2001-155745 | 6/2001 |
| JP | 2001-509950 | 7/2001 |
| JP | 2002-33109 | 1/2002 |
| WO | WO 00/54352 | 9/2000 |

* cited by examiner

*Primary Examiner*—Raymond Alejandro
(74) *Attorney, Agent, or Firm*—McDermott Will & Emery LLP

(57) ABSTRACT

A conductive separator plate for a polymer electrolyte fuel cell is disclosed which includes a cell stack and a plurality of conductive separator plates, the conductive separator plates being formed of a carbon powder and a binder, the conductive separator plates having a main portion which is raised from a peripheral portion surrounding the main portion, the main portion being in contact with an anode or cathode of the fuel cell and being provided with a gas flow path for supplying a fuel gas to the anode or a gas flow path for supplying an oxidant gas to the cathode.

12 Claims, 5 Drawing Sheets

F I G. 4
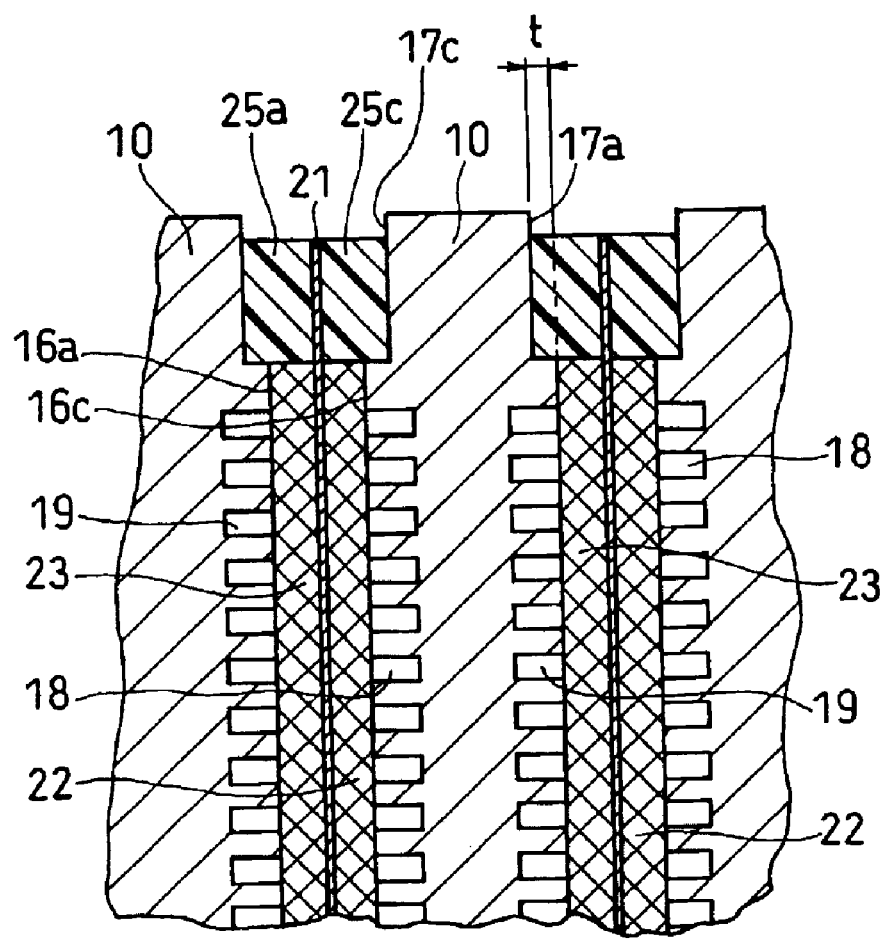

POLYMER ELECTROLYTE FUEL CELL AND CONDUCTIVE SEPARATOR PLATE THEREOF

BACKGROUND OF THE INVENTION

The present invention relates to a fuel cell comprising a polymer electrolyte used for portable power sources, electric vehicle power sources, domestic cogeneration systems, etc.

A fuel cell comprising a polymer electrolyte generates electric power and heat simultaneously by electrochemically reacting a fuel gas containing hydrogen and an oxidant gas containing oxygen such as air. This fuel cell is basically composed of a polymer electrolyte membrane for selectively transporting hydrogen ions and a pair of electrodes disposed on both surfaces of the polymer electrolyte membrane. The electrodes comprise a catalyst layer and a gas diffusion layer which is formed on the outer surface of the catalyst layer and which has both gas permeability and electronic conductivity. The catalyst layer is formed of a mixture of a carbon powder carrying a platinum group metal catalyst and a hydrogen-ion conductive polymer electrolyte, and the gas diffusion layer is composed of, for example, a carbon paper subjected to a water repellency treatment.

In order to prevent outward leakage and intermixing of the supplied fuel and oxidant gases, gas sealing materials or gaskets are arranged so as to encompass the electrodes and sandwich the polymer electrolyte membrane. These sealing materials or gaskets are combined integrally with the electrodes and polymer electrolyte membrane. This is called "MEA" (electrolyte membrane electrode assembly). Disposed outside the MEA are electrically conductive separator plates for mechanically securing the MEA, and at the same time, interconnecting adjacent MEAs electrically in series. The separator plates have, at a portion to come in contact with the MEA, a gas flow path formed for supplying a reactant gas to the electrode and removing a generated gas and a surplus gas. Although the gas flow path may be provided separately from the separator plates, grooves are usually formed on the surfaces of the separator plates to serve as the gas flow path. In a general structure of the fuel cell, the MEAs, separator plates and cooling sections are alternately stacked to form a stack of 10 to 200 cells, the cell stack is sandwiched by end plates with a current collector plate and an insulating plate interposed between the cell stack and each end plate, and the resultant is clamped with clamping bolts from both sides.

In such a polymer electrolyte fuel cell, the separator plates are often composed of a flat carbon plate which has, on a portion to come in contact with the anode or cathode, a gas flow path for supplying the fuel gas or oxidant gas to the anode or cathode. The separator plates are commonly flat, without having any difference in height between the portion on which the gas flow path is formed and its peripheral portion which is to come in contact with a surface of the gaskets sandwiching the polymer electrolyte membrane.

The use of such separator plates will cause the following problems.

In such a fuel cell, the MEA must be sandwiched by an anode-side separator plate and a cathode-side separator plate such that the gas diffusion layers of the anode and the cathode are in contact with the separator plates while the polymer electrolyte membrane, the anode and the cathode are under appropriate pressure. Also, a pair of gaskets sandwiching the periphery of the electrolyte membrane must be compressed by the anode-side and cathode-side separator plates so as to seal the periphery of the MEA. However, when the separator plates are flat as described above, i.e., when the portion of the separator plate in contact with the anode or the cathode and the portion of the separator plate in contact with the gasket are on the same plane, the degree of compression of the gaskets determines the degree of contact between the separator plates and the gas diffusion layers (the term "the degree of compression of the gaskets" as used herein refers to the gasket thickness to be reduced by compression, or the difference in gasket thickness between before and after the gaskets are compressed). Thus, in order to ensure sufficient contact between the separator plates and the gas diffusion layers and therefore minimize the electrical resistance therebetween, it is necessary to make the degree of compression of the gaskets extremely large when the gas diffusion layers are formed of a soft material such as carbon paper.

Further, in order to reduce the thickness of the MEA and therefore reduce the size of the fuel cell stack, the gas diffusion layers to be used in the MEA need to be thinner than the conventional ones. However, since the conventional separator plates are unable to sufficiently compress the gaskets while ensuring sufficient contact with the gas diffusion layers, it has been difficult to make the MEA thinner than the conventional one. Thus, the conventional separator plates have another problem in that they are unable to be applied to a thinner MEA.

BRIEF SUMMARY OF THE INVENTION

The present invention can solve the above-described problems. The present invention is directed to an electrically conductive separator plate for a polymer electrolyte fuel cell which comprises a cell stack comprising a plurality of membrane electrode assemblies and a plurality of conductive separator plates that are stacked alternately, each of the membrane electrode assemblies comprising a hydrogen-ion conductive polymer electrolyte membrane, and an anode and a cathode sandwiching the hydrogen-ion conductive polymer electrolyte membrane. The conductive separator plate in accordance with the present invention is formed of a molded plate comprising a carbon powder and a binder and has a main portion which is raised from a peripheral portion surrounding the main portion, the main portion being in contact with the anode or the cathode and being provided with a gas flow path for supplying a fuel gas to the anode or a gas flow path for supplying an oxidant gas to the cathode.

The present invention provides a polymer electrolyte fuel cell which comprises a cell stack comprising a plurality of membrane electrode assemblies and a plurality of conductive separator plates that are stacked alternately, each of the membrane electrode assemblies comprising a hydrogen-ion conductive polymer electrolyte membrane, an anode and a cathode sandwiching the polymer electrolyte membrane, and a pair of gaskets which surrounds the anode and the cathode and sandwiches a periphery of the polymer electrolyte membrane, wherein the plurality of conductive separator plates comprise at least one pair of an anode-side conductive separator plate and a cathode-side conductive separator plate sandwiching one of the membrane electrode assemblies under pressure, each of the anode-side and cathode-side conductive separator plates is formed of a molded plate comprising a carbon powder and a binder, each of the anode-side and cathode-side conductive separator plates has a main portion which is raised from a peripheral portion surrounding the main portion, the main portion of the anode-side conductive separator plate being in contact with the anode and being provided with a gas flow path for supplying a fuel gas to the anode, the main portion of the cathode-side conductive separator plate being in contact with the cathode and being provided with a gas flow path for supplying an oxidant gas to the cathode, and the pair of gaskets is compressed between the peripheral portion of the anode-side conductive separator plate and the peripheral portion of the cathode-side conductive separator plate.

While the novel features of the invention are set forth particularly in the appended claims, the invention, both as to organization and content, will be better understood and appreciated, along with other objects and features thereof, from the following detailed description taken in conjunction with the drawings.

BRIEF DESCRIPTION OF THE SEVERAL VIEWS OF THE DRAWING

FIG. 4 is a sectional view of the main part of a cell stack comprising the same separator plates.

DETAILED DESCRIPTION OF THE INVENTION

Figure 1:
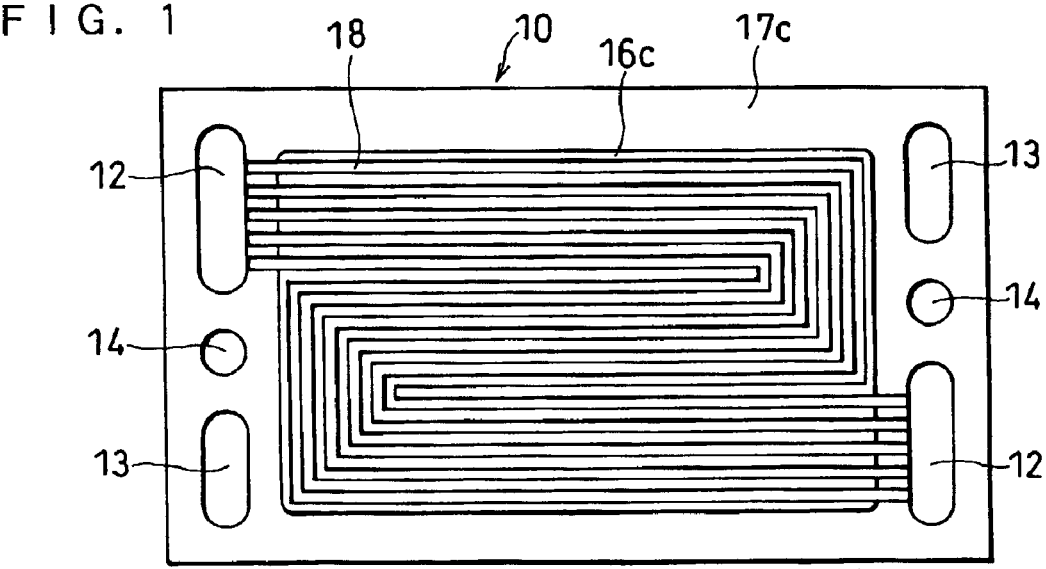
FIG. 1 is a front view of a cathode side of a conductive separator plate used in a fuel cell in one embodiment of the present invention.

The electrically conductive separator plate of the present invention is formed of a molded plate comprising a carbon powder and a binder and has a main portion which is raised from a peripheral portion surrounding the main portion, the main portion being in contact with the anode or the cathode and being provided with a gas flow path for supplying a fuel gas to the anode or a gas flow path for supplying an oxidant gas to the cathode. The present invention makes it possible to make the degree of compression of the gaskets larger, and at the same time, allow the separator plates to sufficiently press against the gas diffusion layers. Thus, even with the use of sufficiently thick gaskets, it is possible to secure contact between the separator plates and thin gas diffusion layers.

In a preferred mode of the present invention, the conductive separator plate has a pair of fuel gas manifold apertures, a pair of oxidant gas manifold apertures and a pair of cooling water manifold apertures in the peripheral portion surrounding the main portion in contact with the anode or cathode.

In another preferred mode of the present invention, the conductive separator plate has, on one side, a first main portion which is raised from a peripheral portion surrounding the first main portion, is in contact with the anode and is provided with a gas flow path for supplying a fuel gas to the anode, and has, on the other side, a second main portion which is raised from a peripheral portion surrounding the second main portion, is in contact with the cathode and is provided with a gas flow path for supplying an oxidant gas to the cathode.

In still another preferred mode of the present invention, the conductive separator plate comprises a combination of an anode-side conductive separator plate and a cathode-side conductive separator plate; the anode-side conductive separator plate has, on one side, a main portion which is raised from a peripheral portion surrounding the main portion, is in contact with the anode and is provided with a gas flow path for supplying a fuel gas to the anode; the cathode-side conductive separator plate has, on one side, a main portion which is raised from a peripheral portion surrounding the main portion, is in contact with the cathode and is provided with a gas flow path for supplying an oxidant gas to the cathode; the anode-side and cathode-side separator plates are combined with each other such that the other sides thereof which do not have the gas flow path face each other; and a cooling water flow path is formed between the combined anode-side and cathode-side conductive separator plates.

In the above-described separator plates, the difference in height between the main portion and the peripheral portion surrounding the main portion is from 80 to 400 $\mu$m.

The separator plates in accordance with the present invention are formed of a molded plate comprising an electrically conductive carbon powder and a binder. They are preferably produced by compression molding a green sheet prepared by extruding a mixture of a carbon powder, for example, 80 to 70 wt % expanded graphite powder, and a binder, for example, 20 to 30 wt % phenol resin. When phenol resin is used as the binder, the compression molding temperature is appropriately 160° C., and the molding surface pressure is appropriately from 350 to 500 kgf/cm$^2$.

The above-mentioned green sheet is preferably compression molded such that the volume of the compressed sheet becomes 60 to 75% of the original volume of the green sheet. In molding separator plates having such shapes as described in Embodiments below, the compression ratio falls within the above-mentioned preferable range when the difference in height between the main portion of the separator plate in contact with the electrode and the peripheral portion surrounding the main portion is from 250 to 400 $\mu$m. In this range of 60 to 75%, the density of the separator plate becomes almost uniform throughout the entire surface, and the moldability also becomes favorable. The density of the molded separator plate becomes from 1.5 to 2.0 g/cm$^3$.

The appropriate thickness of the separator plates in accordance with the present invention is about 3 mm with respect to the single separator plate of Embodiment 1, which serves both as an anode-side separator plate and as a cathode-side separator plate, and the anode-side and cathode-side separator plates of Embodiment 2, which constitute a composite separator plate. The thickness of each of the gaskets arranged on the anode-side and cathode-side of the polymer electrolyte membrane is appropriately from 0.3 to 1.0 mm.

In the following, embodiments of the present invention will be described with reference to drawings.

Embodiment 1

Figure 2:
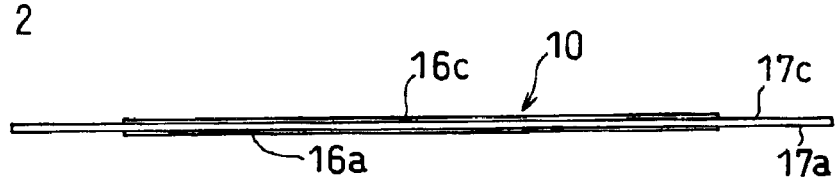
FIG. 2 is a bottom view of the same separator plate.
Figure 3:
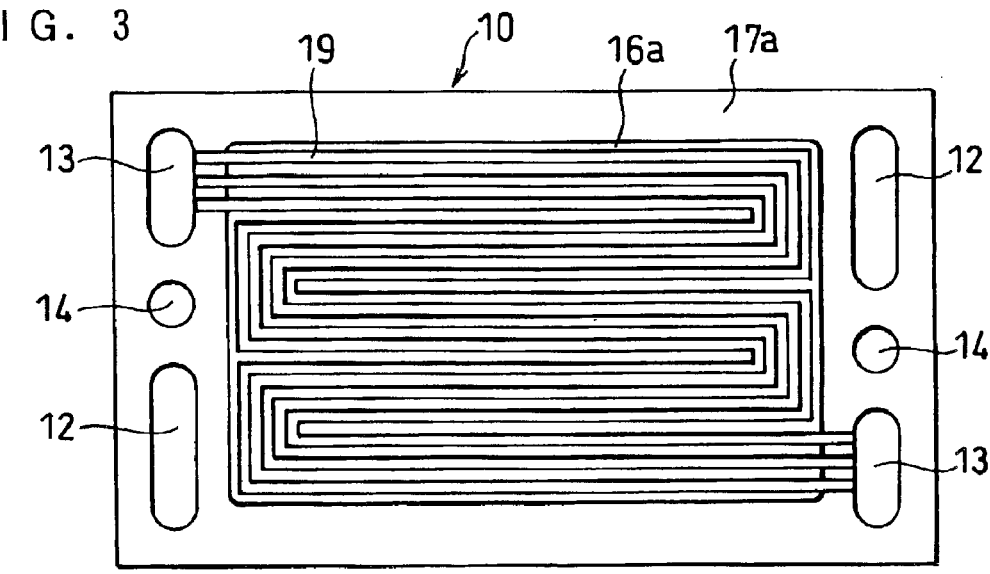
FIG. 3 is a back view of the same separator plate.
Figure 5:
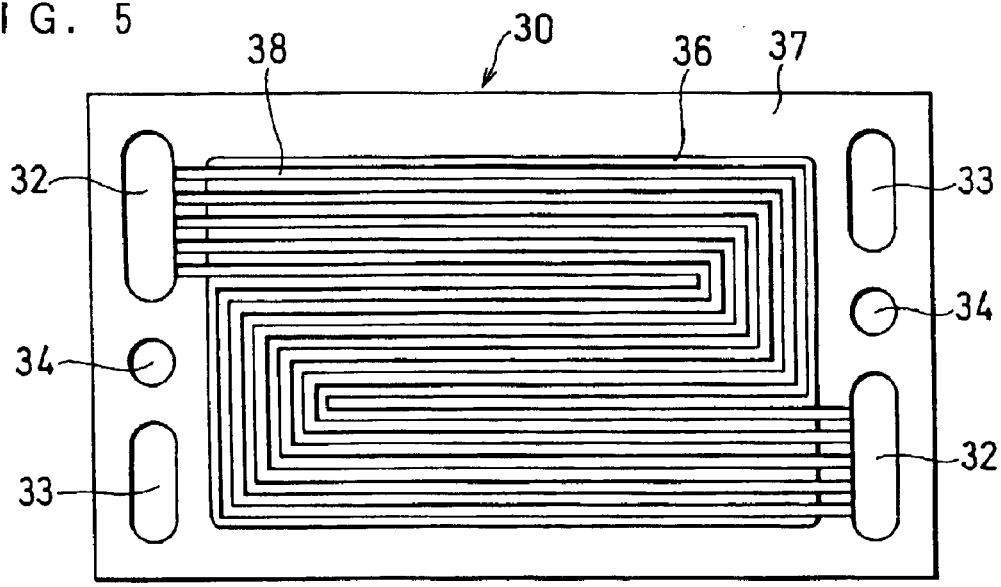
FIG. 5 is a front view of a cathode-side conductive separator plate in another embodiment of the present invention.
Figure 6:
FIG. 6 is a bottom view of the same separator plate.
Figure 7:
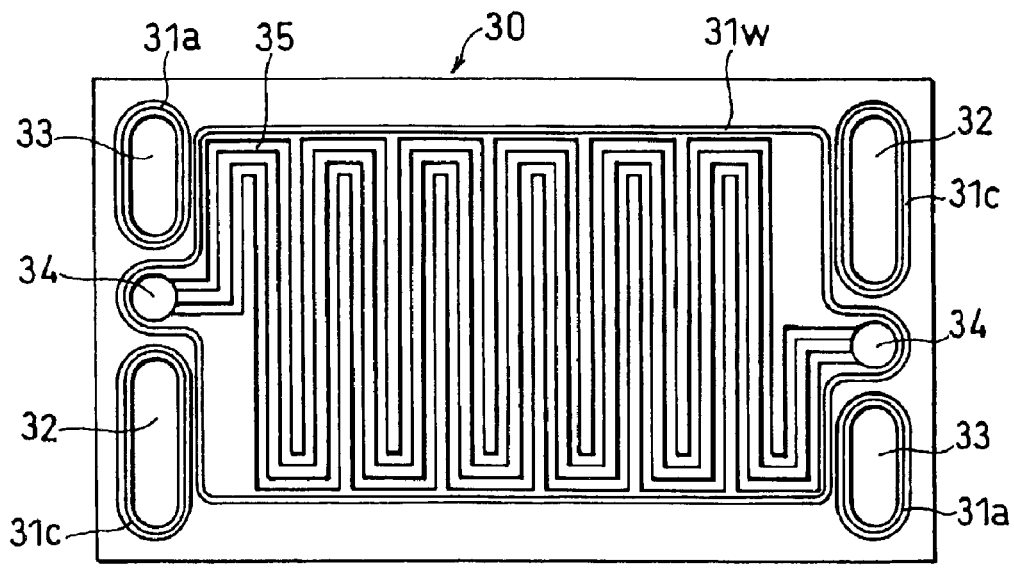
FIG. 7 is a back view of the same separator plate.
Figure 8:
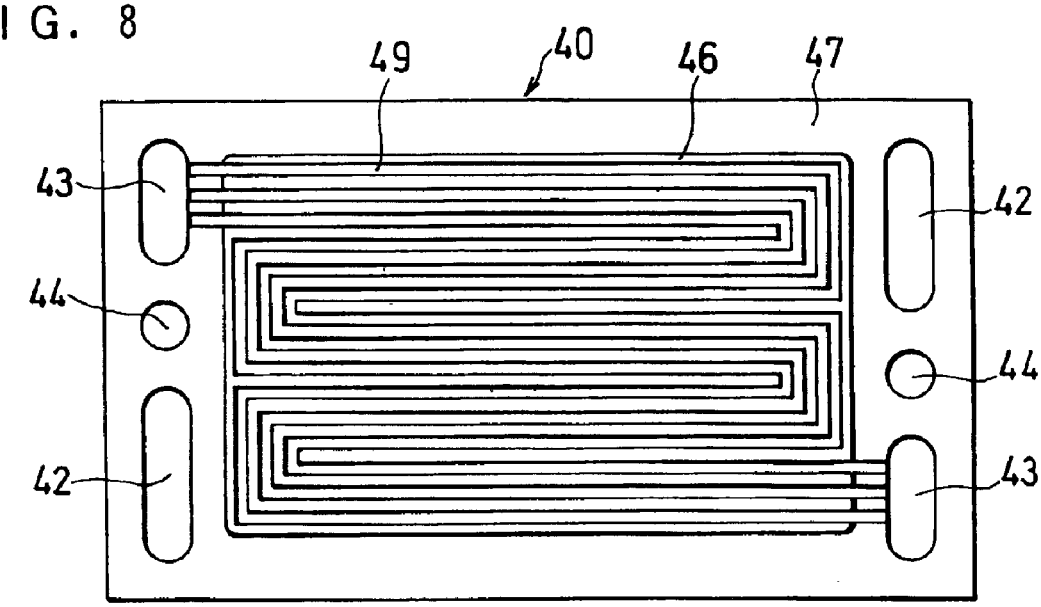
FIG. 8 is a front view of an anode-side conductive separator plate.
Figure 9:
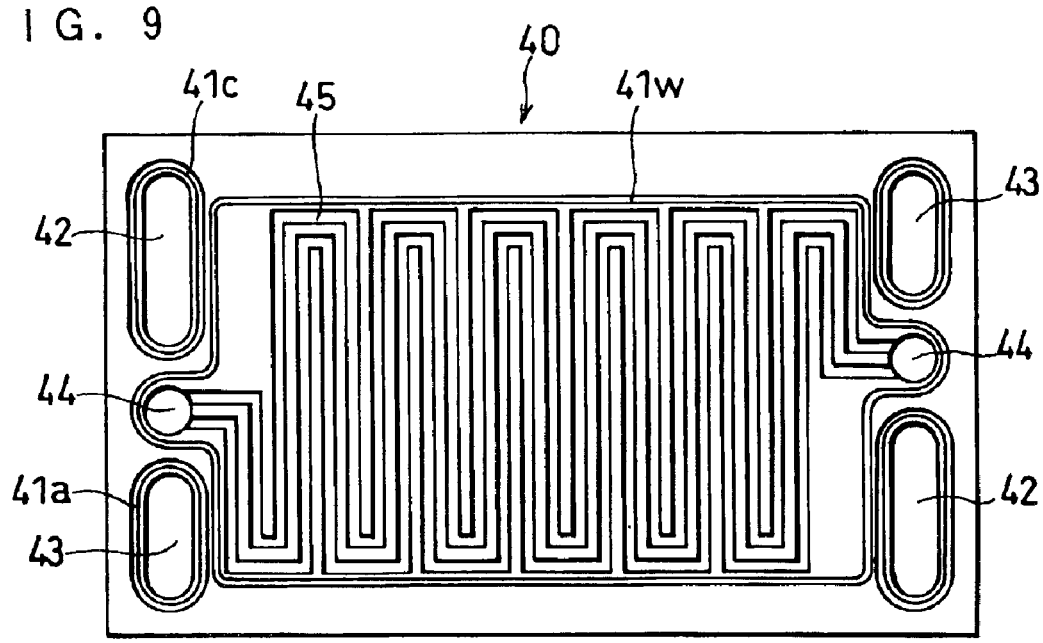
FIG. 9 is a back view of the same separator plate.

FIGS. 1 to 3 illustrate a conductive separator plate of this embodiment. FIG. 4 illustrates the main part of a cell stack comprising the same separator plates.

Numeral 10 represents a single separator plate serving both as an anode-side conductive separator plate and as a cathode-side conductive separator plate. The separator plate 10 has a pair of oxidant gas manifold apertures 12, a pair of fuel gas manifold apertures 13 and a pair of cooling water manifold apertures 14. In each pair of manifold apertures 12, 13 and 14, one of the pair is an inlet-side manifold aperture, and the other is an outlet-side manifold aperture.

The separator plate 10 further has, on one side, a main portion 16c in contact with a cathode, and has, on the other side, a main portion 16a in contact with an anode. The main portion 16c is provided with a gas flow path 18 for supplying an oxidant gas to the cathode, and the main portion 16a is provided with a gas flow path 19 for supplying a fuel gas to the anode. The main portions 16c and 16a are raised from peripheral portions 17c and 17a surrounding the main portions, respectively. The gas flow paths 18 and 19 communicate with the manifold apertures 12 and 13, respectively, formed in the peripheral portions 17c and 17a.

A membrane electrode assembly (MEA) sandwiched by the separator plates comprises a hydrogen-ion conductive polymer electrolyte membrane 21, the cathode 22 and the anode 23 sandwiching a major part, including a central part, of the polymer electrolyte membrane 21, and a pair of gaskets 25c and 25a.

In the MEA sandwiched by the pair of separator plates 10, the cathode 22 and the anode 23, which sandwich the polymer electrolyte membrane 21, are compressed by the main portion 16c of one of the separator plates and the main portion 16a of the other separator plate, while the gaskets 25c and 25a, which sandwich the periphery of the polymer electrolyte membrane 21, are compressed by the peripheral portion 17c of one of the separator plates and the peripheral portion 17a of the other separator plate. Thus, by adjusting the difference in height between the main portion 16c and the peripheral portion 17c and the difference in height between the main portion 16a and the peripheral portion 17a in the separator plates 10, it is possible to appropriately adjust the degree of contact between the gas diffusion layers of the cathode and anode and the main portions of the separator plates as well as the degree of compression of the gaskets. The difference in height between the main portion 16a and the peripheral portion 17a is illustrated as "t" in FIG. 4.

In this embodiment, the oxidant gas flow path 18 was composed of five parallel grooves, while the fuel gas flow path 19 was composed of three parallel grooves. The number of grooves constituting each of the gas flow paths, however, is not limited to the above-described numbers.

The grooves of the gas flow paths were of the serpentine type comprising a combination of linear portions and turns. Except for the unavoidable portions, the center lines of the grooves on one side of the separator plate were allowed to exactly agree with the center lines of the grooves on the other side. Thus, when the MEA is sandwiched by a pair of such separator plates, except for unavoidable portions, the gas flow paths 18 and 19 on both sides of the polymer electrolyte membrane 21 are opposed to each other as shown in FIG. 4.

With respect to the separator plate as described in this embodiment, the thickness of the portion in contact with the anode and the cathode is appropriately 3.0 mm, and the width of the grooves constituting the gas flow paths, the depth of the grooves and the width of the ribs formed between the grooves are appropriately about 1.0 mm each.

Embodiment 2

FIGS. 5 to 7 and FIGS. 8 to 9 illustrate a cathode-side conductive separator plate 30 and an anode-side conductive separator plate 40, respectively, which constitute a composite separator plate having a cooling section.

The cathode-side separator plate 30 has a pair of oxidant gas manifold apertures 32, a pair of fuel gas manifold apertures 33 and a pair of cooling water manifold apertures 34. Further, the separator plate 30 has, on one side, a main portion 36 which is in contact with the cathode, is provided with a gas flow path 38 for supplying the oxidant gas to the cathode and is raised from a peripheral portion 37 surrounding the main portion. The anode-side separator plate 40 has a pair of oxidant gas manifold apertures 42, a pair of fuel gas manifold apertures 43 and a pair of cooling water manifold apertures 44. Further, the separator plate 40 has, on one side, a main portion 46 which is in contact with the anode, is provided with a gas flow path 49 for supplying the fuel gas to the anode and is raised from a peripheral portion 47 surrounding the main portion. The gas flow paths 38 and 49 communicate with the manifold apertures 32 and 43, respectively, formed in the peripheral portions 37 and 47.

The pair of oxidant gas manifold apertures 32, the pair of fuel gas manifold apertures 33 and the pair of cooling water manifold apertures 34, formed in the separator plate 30, communicate with the pair of oxidant gas manifold apertures 42, the pair of fuel gas manifold apertures 43 and the pair of cooling water manifold apertures 44, formed in the separator plate 40, respectively.

The backside of the cathode-side separator plate 30 is a flat surface without any difference in height and is provided with a cooling water flow path 35 communicating with the pair of manifold apertures 34. The backside of the separator plate 30 is further provided with grooves 31c and 31a surrounding the oxidant gas manifold apertures 32 and the fuel gas manifold apertures 33, respectively, and a groove 31w surrounding the cooling water manifold apertures 34 and the cooling water flow path 35.

Likewise, the backside of the anode-side separator plate 40 is a flat surface without any difference in height and is provided with a cooling water flow path 45 communicating with the pair of manifold apertures 44. The backside of the separator plate 40 is further provided with grooves 41c and 41a surrounding the oxidant gas manifold apertures 42 and the fuel gas manifold apertures 43, respectively, and a groove 41w surrounding the cooling water manifold apertures 44 and the cooling water flow path 45.

The cathode-side separator plate 30 and the anode-side separator plate 40 are combined to each other such that their backsides, i.e., the surfaces having the cooling water flow paths, face each other, and the combined separator plates are inserted between the MEAs. On the backsides of the separator plates, an O-ring is inserted between the grooves 31c and 41c, between the grooves 31a and 41a, and between the grooves 31w and 41w, thereby to prevent outward leakage of cooling water from between the separator plates 30 and 40.

In this embodiment, the cooling water flow path was formed on both of the separator plates 30 and 40, but it may be formed only on one of the separator plates.

The composite separator plate of this embodiment has a cooling section for flowing cooling water, and except for the presence of the cooling section, its cathode-facing side and its anode-facing side are basically the same as the separator plate of Embodiment 1.

Embodiment 3

Figure 10:
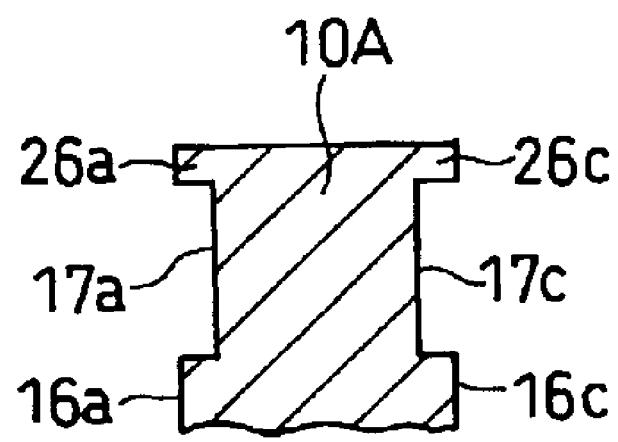
FIG. 10 is a sectional view of a part of a conductive separator plate in still another embodiment of the present invention.

FIG. 10 illustrates a periphery of a separator plate of this embodiment.

A separator plate 10A has ribs 26c and 26a which are as high as the main portions 16c and 16a at the end of the peripheral portions 17c and 17a of the separator plate 10 of Embodiment 1. The ribs 26c and 26a prevent the gaskets from getting out of position when a cell stack is fabricated.

The ribs 26c and 26a are not necessarily as high as the main portions 16c and 16a, and may be lower than the main portions 16c and 16a.

Embodiment 4

A modified example of the gasket will be described in this embodiment.

Figure 11:
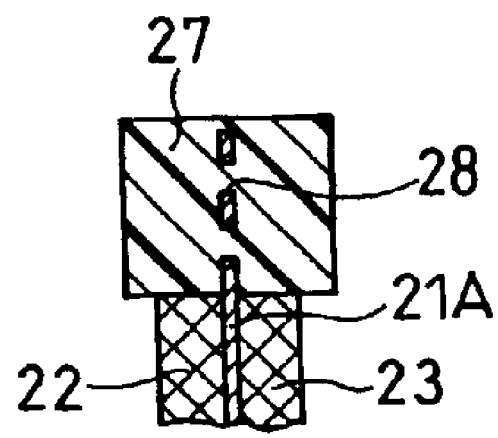
FIG. 11 is a sectional view of the main part of a membrane electrode assembly in another embodiment of the present invention.

FIG. 11 illustrates a gasket 27, in which a portion covering the cathode-side of a polymer electrolyte membrane 21A is connected and integrated to a portion covering the anode-side at through holes 28 of the polymer electrolyte membrane 21A and at a portion covering the edge of the membrane 21A. Such a gasket can be produced, for example, by integrally molding a gasket on the periphery of a polymer electrolyte membrane having a large number of through holes. For this kind of gasket, the entire disclosure of PCT/JP02/00736 including specification, claims, drawings and summary are incorporated herein by reference in its entirety.

In fabricating a fuel cell system using the separator plates in accordance with the present invention, it is preferable to stack the MEAs and the separator plates of Embodiment 1 alternately and insert, as appropriate, the composite separator plate of Embodiment 2 having the cooling section between the MEAs.

In the following, an example of the present invention will be described.

EXAMPLE 1

First, a conductive carbon powder having an average primary particle size of 30 nm (Ketjen Black EC, manufactured by Akzo Chemie Company of the Nederlands) was allowed to carry 50 wt % platinum particles having an average particle size of about 30 Å, to prepare a cathode catalyst powder. The same conductive carbon powder was allowed to carry platinum particles and ruthenium particles, 25 wt % each, having an average particle size of about 30 Å, to prepare an anode catalyst powder.

A dispersion of each of the catalyst powders in isopropanol was mixed with a dispersion of perfluorocarbon sulfonic acid powder in ethyl alcohol to prepare a cathode catalyst paste and an anode catalyst paste. Each of the pastes was applied, by screen printing, onto one side of a 250 $\mu$m thick carbon fiber nonwoven fabric to form a cathode catalyst layer and an anode catalyst layer. This gave a carbon fiber non-woven fabric with the anode catalyst layer formed thereon and a carbon fiber non-woven fabric with the cathode catalyst layer formed thereon. In each of the electrodes thus formed, the content of catalyst metal was 0.5 mg/cm$^2$, and the content of perfluorocarbon sulfonic acid was 1.2 mg/cm$^2$.

These carbon fiber non-woven fabrics were bonded, by hot pressing, to both sides of the center part of a hydrogen-ion conductive polymer electrolyte membrane having an area slightly larger than that of the electrode in such a manner that each of the catalyst layers was in contact with the electrolyte membrane. The polymer electrolyte membrane used in this example was a thin film of perfluorocarbon sulfonic acid (Nafion 112 manufactured by E. I. Du Pont de Nemours & Co. Inc., the United State). Further, gaskets, punched out into the almost same shape as that of the outer peripheral portion of the separator plate, were bonded to both sides of the electrolyte membrane by hot pressing so as to surround the electrodes and sandwich the electrolyte membrane. This gave an MEA.

On the assumption that this MEA was combined with two separator plates of Embodiment 1 to fabricate a unit cell as shown in FIG. 4, simulation testing was conducted to obtain the sealing surface pressure and the reaction force thereto exerted onto the gaskets of the MEA by varying the difference in height ("t" of FIG. 4) between the main portion and the peripheral portion of the separator plates.

In this MEA, the pair of gaskets sandwiching the periphery of the 30 $\mu$m thick polymer electrolyte membrane was made of a fluoroelstomer (VITON GBL, manufactured by DuPont Dow Elastomer Japan), and the free thickness of each of the pair of gaskets was 0.8 mm. In this case, when the portion of the MEA having the cathode and anode is compressed by the main portions of the separator plates to have a thickness of 0.5 mm, the degree of contact between the electrodes and the separator plates becomes most appropriate. With respect to the separator plates, the thickness of the portion in contact with the cathode and the anode was 3.0 mm, and the difference in height between the main portion and the peripheral portion on one side was varied in a range up to 500 $\mu$m.

Under the above-described conditions, the sealing surface pressure and the reaction force thereto were measured when the main portions of the separator plates compressed the gaskets so as to make the thickness of the portion of the MEA having the electrodes the above-mentioned 0.5 mm. The results are shown in Table 1.

TABLE 1

| Difference in height (t) ($\mu$m) | Sealing surface pressure (MPa) | Reaction Force (N/mm) |
| --- | --- | --- |
| 0 | 69 | 120 |
| 50 | 25 | 57 |
| 80 | 11 | 16 |
| 200 | 4 | 3 |
| 300 | 2 | 0.7 |
| 400 | 1 | 0.1 |
| 500 | 0.3 | 0.05 |

In such a polymer electrolyte fuel cell, when the sealing surface pressure of the gaskets is less than 1 MPa, gas leakage takes place. When the reaction force to the sealing surface pressure is more than 20 N/mm, on the other hand, the clamping pressure of the cell stack is required to be extremely large. Thus, both cases are of little practical use. The results of the simulation testing of Table 1 indicate that the difference in height between the main portion of the separator plate in contact with the electrode and the peripheral portion surrounding the main portion is appropriately from 80 to 400 $\mu$m.

As described above, the present invention enables sufficient compression of the gaskets to produce the gas-leakage-free sealing effect while ensuring sufficient contact between the gas diffusion layers of the electrodes and the separator plates. Therefore, the present invention enables reduction in contact resistance between the electrodes and the separator plates and application of thinner gas diffusion layers.

Although the present invention has been described in terms of the presently preferred embodiments, it is to be understood that such disclosure is not to be interpreted as limiting. Various alterations and modifications will no doubt become apparent to those skilled in the art to which the present invention pertains, after having read the above disclosure. Accordingly, it is intended that the appended claims be interpreted as covering all alterations and modifications as fall within the true spirit and scope of the invention.

What is claimed is:

1. A conductive separator plate for a polymer electrolyte fuel cell which comprises a cell stack comprising a plurality of membrane electrode assemblies and a plurality of conductive separator plates that are stacked alternately, each of said membrane electrode assemblies comprising a hydrogen-ion conductive polymer electrolyte membrane, and an anode and a cathode sandwiching said polymer electrolyte membrane, said conductive separator plate being formed of a molded plate comprising a carbon powder and a binder, said conductive separator plate having a main portion which is raised from a peripheral portion which surrounds said main portion, said main portion being in contact with the anode or the cathode and having a gas flow path for supplying a fuel gas to the anode or having a gas flow path for supplying an oxidant gas to the cathode, wherein said gas flow path is in communication with one or more manifold apertures in said peripheral portion, and wherein the entire peripheral portion surrounding the main portion is lower than the main portion.

2. The conductive separator plate for a polymer electrolyte fuel cell in accordance with claim 1, wherein said conductive separator plate has, in said peripheral portion, a pair of fuel gas manifold apertures, a pair of oxidant gas manifold apertures and a pair of cooling water manifold apertures.

3. The conductive separator plate for a polymer electrolyte fuel cell in accordance with claim 1, wherein said conductive separator plate has, on one side, a first main portion which is raised from a peripheral portion surrounding said first main portion, is in contact with the anode and is provided with a gas flow path for supplying a fuel gas to the anode, and has, on the other side, a second main portion which is raised from a peripheral portion surrounding said second main portion, is in contact with the cathode and is provided with a gas flow path for supplying an oxidant gas to the cathode.

4. The conductive separator plate for a polymer electrolyte fuel cell in accordance with claim 1, wherein said conductive separator plate comprises a combination of an anode-side conductive separator plate and a cathode-side conductive separator plate, said anode-side conductive separator plate has, on one side, a main portion which is raised from a peripheral portion surrounding said main portion, is in contact with the anode and is provided with a gas flow path for supplying a fuel gas to the anode, said cathode-side conductive separator plate has, on one side, a main portion which is raised from a peripheral portion surrounding said main portion, is in contact with the cathode and is provided with a gas flow path for supplying an oxidant gas to the cathode, said anode-side and cathode-side separator plates are combined with each other such that the other sides thereof which do not have said gas flow path face each other, and a cooling water flow path is formed between the combined anode-side and cathode-side conductive separator plates.

5. The conductive separator plate for a polymer electrolyte fuel cell in accordance with claim 1, wherein the difference in height between said main portion and said peripheral portion surrounding said main portion is from 80 to 400 $\mu$m.

6. A polymer electrolyte fuel cell which comprises a cell stack comprising a plurality of membrane electrode assemblies and a plurality of conductive separator plates that are stacked alternately, each of said membrane electrode assemblies comprising a hydrogen-ion conductive polymer electrolyte membrane, an anode and a cathode sandwiching said polymer electrolyte membrane, and a pair of gaskets which surrounds the anode and the cathode and sandwiches a periphery of said polymer electrolyte membrane, wherein said plurality of conductive separator plates comprise at least one pair of an anode-side conductive separator plate and a cathode-side conductive separator plate sandwiching one of the membrane electrode assemblies under pressure, each of said anode-side and cathode-side conductive separator plates is formed of a molded plate comprising a carbon powder and a binder, each of said anode-side and cathode-side conductive separator plates has a main portion which is raised from a peripheral portion which surrounds said main portion, said main portion of said anode-side conductive separator plate being in contact with the anode and having a gas flow path for supplying a fuel gas to the anode which is in communication with one or more fuel gas manifold apertures in said peripheral portion, said main portion of said cathode-side conductive separator plate being in contact with the cathode and having a gas flow path for supplying an oxidant gas to the cathode which is in communication with one or more oxidant gas manifold apertures in said peripheral portion, said pair of gaskets is compressed between said peripheral portion of said anode-side conductive separator plate and said peripheral portion of said cathode-side conductive separator plate, and wherein the entire peripheral portion surrounding the main portion is lower than the main portion.

7. The polymer electrolyte fuel cell in accordance with claim 6, wherein said plurality of conductive separator plates comprise at least one separator plate formed of a single plate, and said at least one separator plate has, on one side, a first main portion which is raised from a peripheral portion surrounding said first main portion, is in contact with the anode and is provided with a gas flow path for supplying a fuel gas to the anode, and has, on the other side, a second main portion which is raised from a peripheral portion surrounding said second main portion, is in contact with the cathode and is provided with a gas flow path for supplying an oxidant gas to the cathode.

8. The polymer electrolyte fuel cell in accordance with claim 6, wherein said plurality of conductive separator plates comprise at least one composite separator plate comprising a combination of an anode-side conductive separator plate and a cathode-side conductive separator plate, said anode-side conductive separator plate has, on one side, a main portion which is raised from a peripheral portion surrounding said main portion, is in contact with the anode and is provided with a gas flow path for supplying a fuel gas to the anode, said cathode-side conductive separator plate has, on one side, a main portion which is raised from a peripheral portion surrounding said main portion, is in contact with the cathode and is provided with a gas flow path for supplying an oxidant gas to the cathode, said anode-side and cathode-side separator plates are combined with each other such that the other sides thereof which do not have said gas flow path face each other, and a cooling water flow path is formed between the combined anode-side and cathode-side conductive separator plates.

9. The polymer electrolyte fuel cell in accordance with claim 7, wherein said at least one separator plate has, on said peripheral portion, a pair of fuel gas manifold apertures and a pair of oxidant gas manifold apertures, said fuel gas flow path communicates with said pair of fuel gas manifold apertures, and said oxidant gas flow path communicates with said pair of oxidant gas manifold apertures.

10. The polymer electrolyte fuel cell in accordance with claim 8, wherein each of said anode-side and cathode-side conductive separator plates has, on said peripheral portion, a pair of fuel gas manifold apertures, a pair of oxidant gas manifold apertures, and a pair of cooling water manifold apertures, said fuel gas flow path communicates with said pair of fuel gas manifold apertures, said oxidant gas flow path communicates with said pair of oxidant gas manifold apertures, and said cooling water flow path communicates with said pair of cooling water manifold apertures.

11. The polymer electrolyte fuel cell in accordance with claim 6, wherein the difference in height between said main portion and said peripheral portion surrounding said main portion is from 80 to 400 $\mu$m in each of said anode-side and cathode-side conductive separator plates.

12. The polymer electrolyte fuel cell in accordance with claim 6, wherein said pair of gaskets are connected to each other at through holes formed in the periphery of said polymer electrolyte membrane and at a portion covering an edge of said polymer electrolyte membrane.

* * * * *